United States Patent [19]

Hefner

[11] Patent Number: 4,691,665
[45] Date of Patent: Sep. 8, 1987

[54] HUMMINGBIRD FEEDER
[75] Inventor: Boby R. Hefner, Coleman, Tex.
[73] Assignee: Hefner Plastics, Inc., Troup, Tex.
[21] Appl. No.: 785,796
[22] Filed: Oct. 8, 1985
[51] Int. Cl.$^4$ .................................... A01K 39/026
[52] U.S. Cl. ................................ 119/77; 119/51 R
[58] Field of Search ............... 119/61, 63, 51 R, 77; D30/14, 16

[56]  References Cited
U.S. PATENT DOCUMENTS

| 1,834,516 | 12/1931 | Dains | 119/77 |
| 3,136,296 | 6/1964 | Luin | 119/52 R |
| 3,292,589 | 12/1966 | Williams | 119/77 |
| 3,441,002 | 4/1969 | Lawalin et al. | 119/23 X |
| 3,913,527 | 10/1975 | Kilham | 119/51 R |
| 4,019,462 | 4/1977 | Palfalvy | 119/51 R X |
| 4,441,458 | 4/1984 | Mercil | 119/51 R |
| 4,558,662 | 12/1985 | Peterson | 119/77 |

Primary Examiner—Robert P. Swiatek
Attorney, Agent, or Firm—Arthur F. Zobal

[57]  ABSTRACT

A hummingbird feeder device suspended usually by a wire or string dispenses nectar to hummingbirds. An ant barrier is created by completely encircling the support used for suspension with a wall forming a moat containing an edible cooking oil or some other substance known to bar the passage of ants.

18 Claims, 7 Drawing Figures

HUMMINGBIRD FEEDER

FIELD OF INVENTION

The present invention relates to bird feeders that contain food found to be attractive to insects such as ants as well as to birds.

BACKGROUND OF THE INVENTION

Hummingbird feeders are designed to dispense nectar, which is usually a sugar-water solution, on demand. They are specialized feeders because provision must be made for the hummingbird's long beak, with which it obtains the nectar. The feeders are normally suspended from a tree branch or other high objects five to ten feet above the ground by a wire or string. The sugar-water solution not only attracts hummingbirds, but also ants that climb down the suspension wire to reach the nectar. Hummingbirds may be prevented from feeding merely by the presence of ants that collect on the feeder. In addition, the ants will contaminate the nectar by falling in and drowning in the solution. In the past, users have been instructed to coat the wire of their prior art feeders with some type of solid food oil, such as butter or shortening, to render the feeders ant resistant. While this jury-rigging serves to somewhat deter, it does not fully prevent the ants from reaching the nectar solution.

The objective of the present invention is to provide an improved hummingbird feeder device that is not subject to the disadvantages of the prior art.

SUMMARY OF THE INVENTION

The invention provides an improved hummingbird feeder device for keeping ants off the feeder and out of the nectar supply. The main components of the feeder device are a reservoir, one or more feeding stations, a support, and a wall forming a moat surrounding the support. The reservoir stores the nectar until called for by the feeding actions of a hummingbird. The feeder is usually suspended by a wire or string attached to a support located on top of the reservoir. The moat completely surrounds the support and can be filled with any substance or solution that acts as a barrier to ants, however, an edible cooking oil is preferred.

DESCRIPTION OF THE PREFERRED EMBODIMENT

Figure 1:
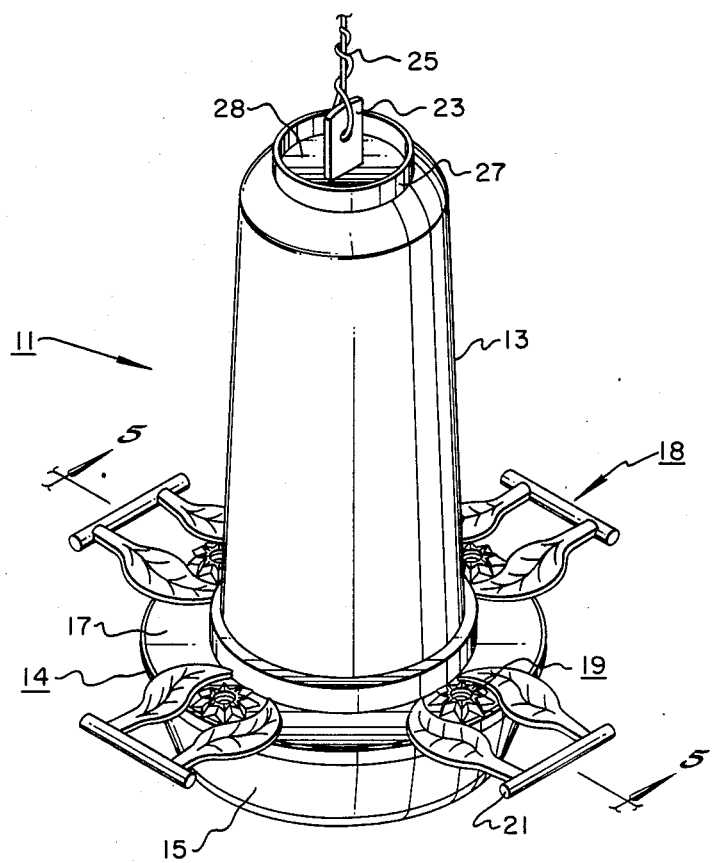
FIG. 1 is a schematic isometric view showing a hummingbirdfeeder device in accordance with a preferred embodiment of the invention.
Figure 2:
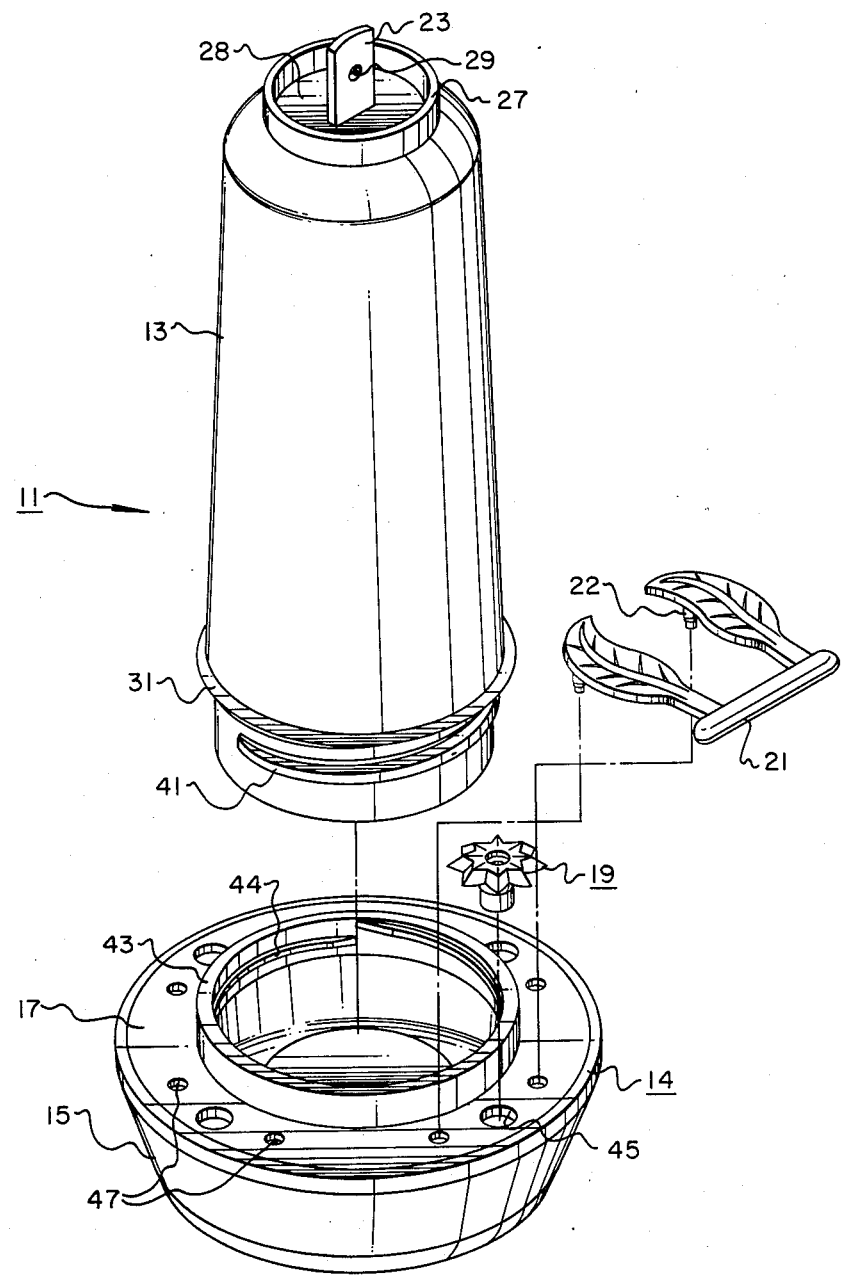
FIG. 2 is an exploded isometric view showing the reservoir, the bowl assembly, and a feeding station.

FIGS. 1 and 2 illustrates a preferred embodiment of the hummingbird feeder device 11. The component parts of the feeder device 11 are a reservoir 13, a bowl assembly 14, feeding stations 18, a support 23, a support wire 25, and a moat wall 27.

The reservoir 13 is conical in shape with the upper end flattened and the lower end open. The only opening in the reservoir 13 is the lower end. The support member 23 and the wall 27 are attached to the flattened upper end. The feeder 11 is suspended by extending a wire 25 through a hole 29 in the support 23 and wrapping the lower end of the wire around itself. The wall 27 completely encircles the support 23 and is integrated with the upper end of the reservoir 13 such that liquid can be poured into the moat 28 formed by the wall 27 and the upper end without leakage. Near the lower end of the reservoir 13 is a narrow flange 31. Between the flange 31 and the open end of the reservoir 13 are threads 41.

The bowl assembly has two major portions, which are the bowl 15 and the upper wall 17. The bowl 15 is circular in shape. The bottom has a central indentation 15A projecting up into the bowl 15 thereby preventing pooling of the nectar in the center of the bowl away from the nectar ports 19. The inner lip of the bowl 15 has a groove 35 to receive the edge of the upper wall 17. The upper wall 17 is washershaped with a flange 33 extending radially outward from the outer perimeter surface. The flange 33 is sized and shaped to fit into the groove 35. The upper wall 17 is assembled into the bowl 15 by engaging the flange 33 into the groove 35. The inner diameter of the uppper wall 17 contains a flange 43 extending axially away from the bowl 15. The inner side of the flange 43 contains threads 44 that matingly receive the threads 41 on the lower ends of the reservoir 13. The flange 31 acts as a stop guard preventing the reservoir 13 from being screwed too far into the bowl assembly. A plurality of holes are drilled into the upper wall 17 to accomodate the feeding stations 18. Each feeding station 18 requires 3 holes; a center aperture 45 and two smaller holes 47 disposed on either sides of the center aperture 45.

Figure 3:
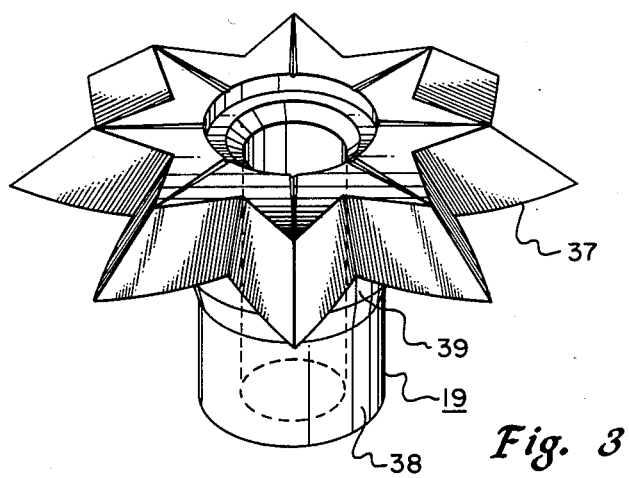
FIG. 3 is a schematic isometric view showing a nectar port.
Figure 4:
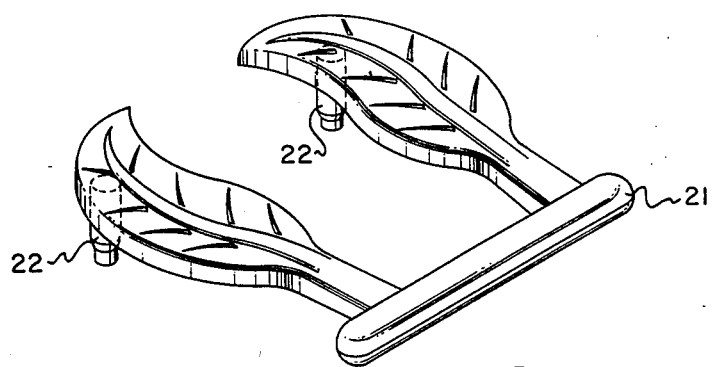
FIG. 4 is a schematic isometric view showing a leaf perch.
Figure 6:
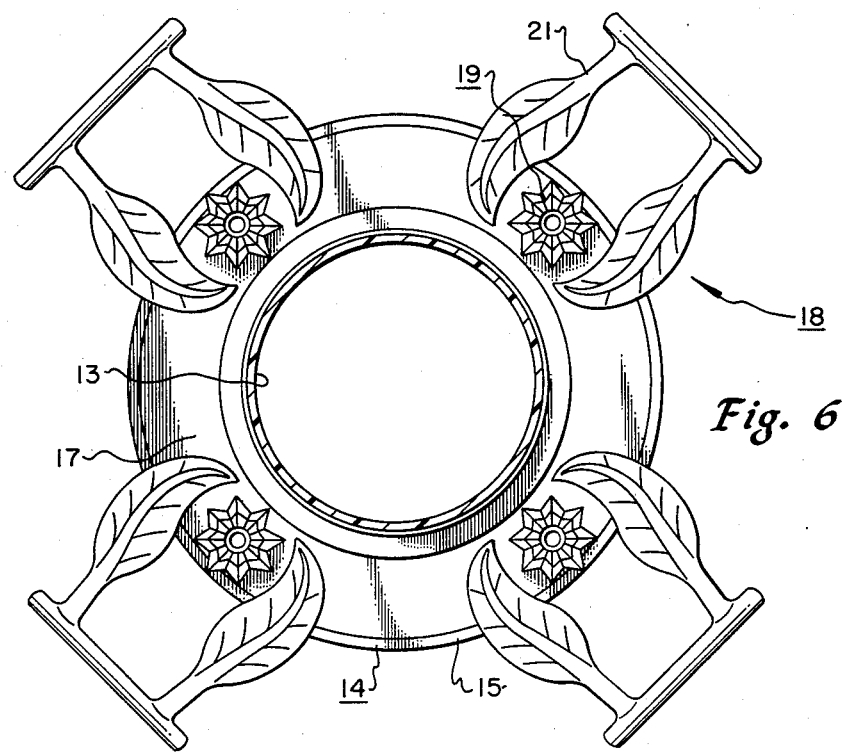
FIG. 6 is a schematic transverse section view of FIG. 5 taken along lines 6—6 thereof.
Figure 7:
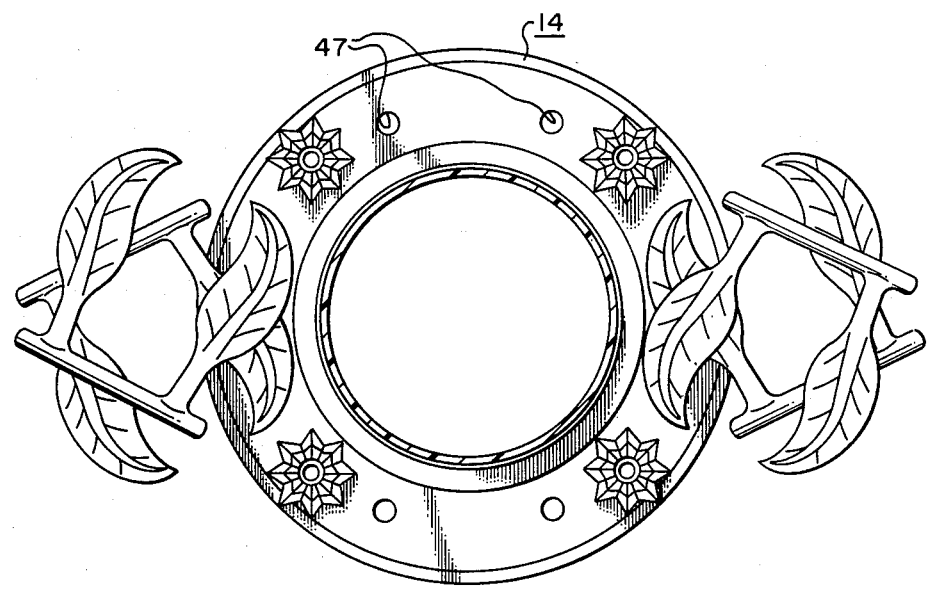
FIG. 7 is the same as FIG. 6 except the leaf perches are positioned for storage or shipping.

The feeding stations 18 are the locations from which the hummingbird obtains nectar and consists of nectar ports 19 and leaf perches 21. A nectar port 19 is shown in FIG. 3. Each nectar port 19 is a short narrow insert 38 with an aperture running therethrough designed to accomodate the beaks of hummingbirds. At the upper end 39 the outside diameter of the insert 38 increases to fit snugly into the center aperture 45 in the upper wall 17. This expanded end 39 is rimmed by a decorative blossom-shaped flange 37 extending radially outward. The leaf perches 21 are "U" shaped and are of a decorative leaf-twig configuration (see FIG. 4). Two projections 22 extend downward from the leaves. These projections 22 snap into the holes 47. An alternative configuration is to remove one projection 22 from its hole 47 and swing the perch 21 around as shown in FIG. 7. This configuration is useful for storing the feeder device 11.

A suitable material to use in fabricating the feeder device 11 is polypropylene plastic. Hummingbirds respond to and are attracted by bright colors, particularly red. Thus the majority of the feeder assembly 11 is composed of red plastic, the nectar ports 19 are made of yellow plastic, and the leaf perches 21 are green plastic.

Assembly of the feeder device 11 is as follows: Being held upside down, the reservoir 13 is filled with a nectar solution. While still holding the reservoir 13 upside down, the bowl assembly 14 is screwed on securely.

Then the feeder device 11 is quickly uprighted. The liquid nectar solution is shown at 16 in FIG. 5.

Since there are no other openings in the reservoir 13, the level of nectar can be held at a higher elevation than the nectar level in the bowl assembly 14. When a sufficient amount of nectar is taken from the bowl assembly 14, air is able to bubble up in the reservoir 13, thus releasing a quantity of nectar into the bowl assembly 14. Any hole in the reservoir above the level of nectar in the bowl assembly would cause the nectar to leak out from either the hole itself or the bowl assembly through the nectar ports 19 because air would be then allowed to displace the nectar.

Figure 5:
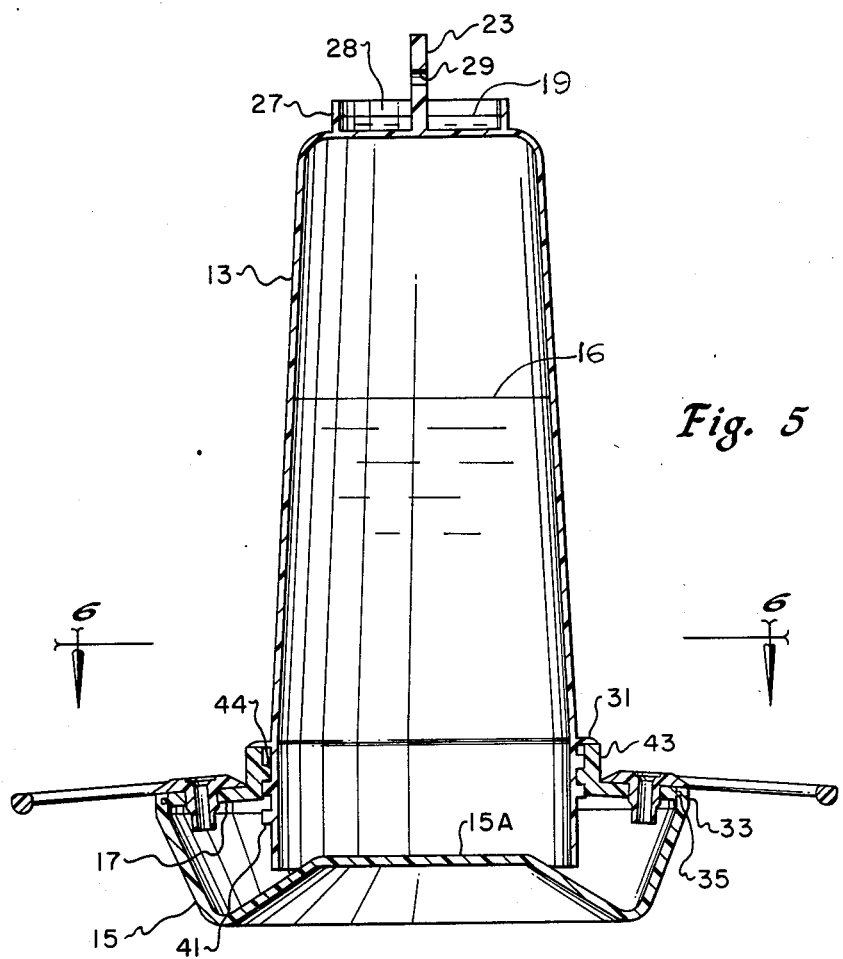
FIG. 5 is a schematic longitudinal section of FIG. 1 taken along lines 5—5 thereof.

Preferably liquid cooking oil suitable for human consumption, such as corn oil or sunflower seed oil, is added to the moat 28. This type of oil has been found suitable to act as a barrier to ants yet will not harm hummingbirds. Only a small amount of oil is needed; about 1/16 inch deep. In FIG. 5 the oil is shown at 19. The feeder is hung by the wire 25 onto a tree limb, nail, or the like. The oil, retained in the moat 28 formed by the wall 27, and completely surrounding the support 23, forms the ant barrier. Ants are completely barred from areas of the feeder below the barrier. The above described ant barrier has proved to be 100% effective in keeping ants off of the feeder.

While any substance that deters or kills ants could be placed in the moat and would provide an effective ant barrier, substances suitable for human consumption are preferred.

It will be understood by those skilled in the art that the foregoing disclosure is by way of illustrative example only and may be changed in various ways without departing from the principles of the invention.

I claim:

1. A bird feeder device comprising:
   a reservoir having a top end and a lower end with an opening and a side wall between said top end and said lower end, said side wall near said lower end having exterior threads, said lower end opening being at least as large as other interior portions of said reservoir, including the interior portion at the top end,
   a bowl assembly having an upper open end with interior threads adapted to matingly engage said threads on said side wall of said reservoir such that said bowl assembly may be removably coupled to said lower end of said reservoir,
   said reservoir and said bowl assembly when coupled together being adapted to hold a liquid suitable for feeding birds,
   said bowl assembly having an upper wall which extends outwardly from the side wall of said reservoir when said bowl assembly is coupled to the lower end of said reservoir,
   said upper wall of said bowl assembly comprising a port for allowing a bird to feed on the liquid in said assembly by way of said port,
   support means coupled to said top end of said reservoir to which a suspending means may be coupled for suspending said bird feeder device,
   a wall means integral to the top end of said reservoir and surrounding said support means for holding a liquid substance suitable for preventing the passage of ants or the like from the suspending means to the bird feeder device outside of said wall means.
2. The bird feeder device of claim 1 wherein:
   said wall means and said top end form a container for holding a liquid substance which surrounds said support means when said liquid substance is located in said container.
3. The feeder device of claim 1 further comprising:
   a nonaqueous liquid substance for preventing the passage of ants or the like from the suspending means to the bird feeder device outside of said wall means contained within said wall means and surrounding said support means.
4. The feeder device of claim 3, wherein:
   said nonaqueous substance is cooking oil.
5. The bird feeder device of claim 1 wherein said port comprises:
   an aperture formed through said upper wall of said bowl assembly,
   insert means having an aperture formed therethrough which may be removably inserted into said aperture formed through said upper wall of said bowl assembly.
6. The bird feeder device of claim 1, further comprising:
   at least two holes formed through said upper wall of said bowl assembly,
   perch means having two spaced apart arm means with a projection at the end of each of said arm means adapted to be removably received in two of said holes of said upper wall of said bowl assembly for removably coupling said perch means to said upper wall of said bowl assembly for allowing a bird to perch on said perch means,
   said perch means being adapted to have one of its arm means uncoupled from said upper wall of said bowl assembly and with the projection of its other arm means located in a hole in said upper wall of said bowl assembly, rotated to a different position for storage purposes.
7. The bird feeder device of claim 6, wherein:
   said support means is integrally coupled to said top end of said reservoir,
   said reservoir including said wall means and said support means being formed of the same type of plastic material.
8. The feeder device of claim 6, wherein said bowl assembly comprises:
   said bowl assembly comprises inside of its upper edge,
   said upper wall comprising an annular shaped member with its outer edge fitted into said groove.
9. The feeder device of claim 1, wherein:
   said reservoir is quasi-conical in shape with the lower end being larger than the top end.
10. The feeder device of claim 1, wherein:
    said support means is integrally coupled to said top end of said reservoir,
    said reservoir including said wall means and said support means being formed of the same type of plastic material.
11. The feeder device of claim 1, wherein said bowl assembly comprises:
    a circular shaped bowl with a groove formed on the inside of its upper edge,
    said upper wall comprising an annular shaped member with its outer edge fitted into said groove.
12. A bird feeder device, comprising:
    a reservoir having a top and a lower end with an opening and a side wall between said top end and said lower end, said side wall near said lower end having exterior threads, a bowl assembly having an upper open end with interior threads adapted to matingly engage said threads on said side wall of said reservoir such that said bowl assembly may be removably coupled to said lower end of said reservoir, said bowl assembly having an upper wall which extends outwardly from the side wall of said reservoir when said bowl assembly is coupled to the lower end of said reservoir, said upper wall of said bowl assembly comprising port means extending therethrough, said reservoir and said bowl assembly when coupled together being adapted to hold a liquid suitable for feeding birds by way of said port means of said bowl assembly, support means coupled to said top end of said reservoir to which a suspending means may be coupled for suspending said bird feeder device, a wall means located at the top end of said reservoir and surrounding said support means for holding a liquid substance suitable for preventing the passage of ants or the like from the suspending means to the bird feeder device outside of said wall means, at least two holes formed through said upper wall of said bowl assembly with a port means being located between said two holes, perch means having two spaced apart arm means with a projection at the end of each of said arm means adapted to be removably received in said two holes of said upper wall of said bowl assembly for removably coupling said perch means to said upper wall of said bowl assembly for allowing a bird to perch on said perch means, said perch means being adapted to have one of its arms means uncoupled from said upper wall of said bowl assembly and with the projection of its other arm means located in one of said holes in said upper wall of said bowl assembly, rotated to a different position for storage purposes.

13. The feeder device of claim 12, wherein:
said wall means is integral with the top end of said reservoir.

14. The feeder device of claim 13, wherein:
said support means is integrally coupled to said top end of said reservoir.

15. The feeder device of claim 14, wherein:
said reservoir including said wall means and said support means being formed of the same type of plastic material.

16. The feeder device of claim 12, wherein:
said opening of said lower end of said reservoir is at least as large as other interior portions of said reservoir including the interior portion at the top end.

17. The feeder device of claim 16, wherein:
said wall means is integral with the top end of said reservoir,
said support means is integrally coupled to said top end of said reservoir,
said reservoir including said wall means and said support means being formed of the same type of plastic material.

18. The feeder device of claim 12, wherein said bowl assembly comprises:
a circular shaped bowl with a groove formed on the inside of its upper edge,
said upper wall comprising an annular shaped member with its outer edge fitted into said groove.

* * * * *